(12) United States Patent
Arnaise et al.

(10) Patent No.: US 11,610,386 B2
(45) Date of Patent: Mar. 21, 2023

(54) ELECTRONIC DEVICE FOR IDENTIFYING AND TRACKING AT LEAST ONE TARGET, ASSOCIATED ELECTRONIC SYSTEM, METHOD AND COMPUTER PROGRAM

(71) Applicant: BULL SAS, Les Clayes sous Bois (FR)

(72) Inventors: Nicolas Arnaise, Echirolles (FR); Cécile Boukamel-Donnou, Echirolles (FR); Benoit Pelletier, Saint Etienne de Crossey (FR)

(73) Assignee: BULL SAS, Les Clayes sous Bois (FR)

( * ) Notice: Subject to any disclaimer, the term of this patent is extended or adjusted under 35 U.S.C. 154(b) by 259 days.

(21) Appl. No.: 17/123,619

(22) Filed: Dec. 16, 2020

(65) Prior Publication Data
US 2021/0182590 A1  Jun. 17, 2021

(30) Foreign Application Priority Data

Dec. 17, 2019 (FR) ..................... 19 14599

(51) Int. Cl.
*G06V 10/20* (2022.01)
*G06V 40/20* (2022.01)
*G06V 20/52* (2022.01)
*G06V 10/82* (2022.01)

(52) U.S. Cl.
CPC ............ *G06V 10/255* (2022.01); *G06V 10/82* (2022.01); *G06V 20/52* (2022.01); *G06V 40/20* (2022.01)

(58) Field of Classification Search
CPC ...... G06V 10/255; G06V 10/82; G06V 20/52; G06V 40/20; G06N 3/0454; G08B 13/19608; G08B 29/185; G06T 2207/30196; G06T 2207/30241; G06T 2207/30232; G06T 7/292; H04N 7/181
See application file for complete search history.

(56) References Cited

U.S. PATENT DOCUMENTS

| | | | |
|---|---|---|---|
| 9,111,147 | B2 | 8/2015 | Thornton et al. |
| 2019/0294889 | A1 | 9/2019 | Sriram et al. |
| 2021/0073517 | A1* | 3/2021 | Ahmad ................ G06V 10/763 |

OTHER PUBLICATIONS

Search Report for FR1914599 dated Jul. 14, 2020, 3 pages.
Cosimo et al., "People re-identification using skeleton standard posture and color descriptors from RGB-D data", Pattern Recognition, vol. 89, May 1, 2019, pp. 77-90.
(Continued)

*Primary Examiner* — Edward F Urban
*Assistant Examiner* — Wassim Mahrouka
(74) *Attorney, Agent, or Firm* — Arc IP Law, PC; Joseph J. Mayo

(57) ABSTRACT

An electronic device for identifying and tracking at least one target, including: a receiver module configured to receive images from a network of image sensors; a determination module configured to determine visual signatures of a respective target from the received images, each visual signature being determined from a respective image including a representation of the target, each visual signature being in the form of a vector in multi-dimensional space; a first filtering module configured to filter the visual signatures; a computation module configured to compute a reference visual signature, in multi-dimensional space; a detection module configured to detect an appearance of the target, and a second filtering module.

10 Claims, 2 Drawing Sheets

(56) References Cited

OTHER PUBLICATIONS

Yantao et al., "Learning Deep Neural Networks for Vehicle Re-ID with Visual-spatio-Temporal Path Proposals", 2017 IEEE International Conference on Computer Vision (ICCV), Oct. 22, 2017, pp. 1918-1927.
Martinel et al., "Person Reidentification in a Distributed Camera Network Framework", IEEE Transactions on Cybernetics, vol. 47, No. 11, Nov. 1, 2017, pp. 3530-3541.

* cited by examiner

ELECTRONIC DEVICE FOR IDENTIFYING AND TRACKING AT LEAST ONE TARGET, ASSOCIATED ELECTRONIC SYSTEM, METHOD AND COMPUTER PROGRAM

CROSS-REFERENCE TO RELATED APPLICATIONS

This application is a U.S. non-provisional application claiming the benefit of French Application No. 19 14599, filed on Dec. 17, 2019, which is incorporated herein by reference in its entirety.

BACKGROUND OF THE INVENTION

Field of the Invention

The present invention relates to an electronic device for identifying and tracking at least one target.

The invention also relates to an electronic system for identifying and tracking at least one target comprising a network of image sensors and such an electronic identification and tracking device.

The invention also relates to a method for identifying and tracking at least one target, the method being implemented by such an electronic identification and tracking device.

The invention also relates to a non-transitory computer-readable medium including a computer program comprising software instructions which, when executed by a computer, implement such an identification and tracking method.

The invention relates to the field of target surveillance, specifically the field of video surveillance of targets. In particular, the invention relates to the field of analysis, i.e., of processing images received by image sensors to track at least one target. The specific target(s) are persons.

Description of the Related Art

Classically, a network of image sensors transmits captured images to a computing device that enables the recognition of one or more persons present in the images.

For example, U.S. Pat. No. 9,111,147 B2 describes a system for identifying or recognizing a person from images. However, such methods are not entirely satisfactory.

For example, such methods often incorrectly identify similar but different people as the intended target. Also, these methods do not identify the target in some images. The reliability of detection is therefore not optimal.

Also, these methods are often complex and thus require a high computing capacity, given the large number of images to analyze.

SUMMARY OF THE INVENTION

Thus, one object of the invention is to propose an electronic identification and tracking device that is less complex and enables the identification and tracking of at least one target in a more reliable way.

For this purpose, the invention proposes an electronic device for identifying and tracking at least one target, comprising:
- a receiver module configured to receive images from an image sensor network;
- a determination module configured to determine visual signatures of a respective target from the received images, each visual signature being determined from a respective image including a representation of said target, each visual signature in the form of a vector in multi-dimensional space;
- a first filtering module configured to filter the visual signatures by retaining each visual signature, having a distance, in multidimensional space, from the visual signature nearest in distance to said visual signature that is less than a reference threshold;
- a calculation module configured to calculate a reference visual signature, in multidimensional space, from an average of the visual signatures retained by the first filtering module;
- a detection module configured to detect an appearance of the target in at least one new received image by comparing the reference visual signature with a visual signature of the target representation included in the new received image, and
- a second filtering module comprising at least one of a spatio-temporal filter configured to filter said appearance as a function of a position of the image sensor associated with an acquisition of the new received image and a temporal instant of said acquisition, and a visual appearance filter of the target configured to filter said appearance as a function of at least one visual characteristic relating to the representation of the target included in the new received image.

Thus, the electronic device for identification and tracking according to the invention enables the more reliable identification and tracking of at least one target. Indeed, the second filtering module makes it possible to filter out false detections, also called false positives.

Thanks to the filtering of visual signatures, the required computing capacity is limited. Since visual signatures are in the form of a vector in multidimensional space, they are easy to process, using little computing capacity for this.

Also, the first filtering module enables filtering out aberrant visual signatures, keeping each visual signature with a distance, from the closest visual signature in terms of distance from said visual signature, that is lower than the reference threshold. This reduces the number of subsequent calculations, as fewer visual signatures have to be processed, and also increases the reliability of target identification and tracking.

In particular, the combination of the first filtering module and the calculation module enables obtaining an average of the visual signatures already filtered by the first filtering module, thus enabling a simple and efficient calculation. Thus, the required calculation capacity is further reduced.

According to other aspects of the invention, the electronic identification and tracking device comprises one or more of the following features, taken in isolation or in any technically possible combination:
- the determination module is configured to obtain the representation of said target via a neural network, with the input variables of the neural network being the received images and an output variable being said representation;
- the spatio-temporal filter is configured to calculate an average speed of movement of the target between a reference position of the target and the position of the image sensor associated with the acquisition of the new received image;
- the spatio-temporal filter is configured to assign to the said appearance a probability of effective detection of the target as a function of the average velocity, in comparison with a reference velocity;

each visual feature is selected from the group consisting of: a color within the target representation and a shape of an outline of the target representation.

the visual appearance filter comprises a model with at least a first parameter, with the first parameter being color clarity, the model being adapted to implement the CIELAB color space.

the visual appearance filter comprises a neural network, configured to receive, as input, the target representation included in the new received image, and to provide, as output, at least the visual characteristic related to the target representation included in the new received image, with the visual appearance filter configured to compare said visual characteristic with a corresponding reference visual characteristic.

The invention further comprises an electronic system for identifying and tracking at least one target, comprising an image sensor network and at least one electronic device for identifying and tracking at least one target as described above, with said device configured to receive and process images from the image sensor network.

The invention also relates to a method for identifying and tracking at least one target, with the method implemented by an electronic identification and tracking device and comprising:
the reception of images from an image sensor network;
the determination of visual signatures of a respective target from the received images, with each visual signature determined from a respective image including a representation of said target, and each visual signature in the form of a vector in multi-dimensional space;
the first filtering comprising filtering the visual signatures by retaining each visual signature having, in multi-dimensional space, a distance from the visual signature nearest in distance to said visual signature that is less than a reference threshold;
the calculation, in multidimensional space, of a reference visual signature from an average of the visual signatures retained during the first filtering;
the detection of an appearance of the target in at least one new received image by comparing the reference visual signature with a visual signature of the target representation included in the new received image, and
the second filtering comprising at least a spatio-temporal filtering, comprising the filtering of the said appearance as a function of a position of the image sensor associated with an acquisition of the new image received and of a temporal instant of the said acquisition, and a filtering of visual appearance of the target, with the filtering of visual appearance comprising the filtering of the said appearance as a function of at least one visual characteristic relating to the representation of the target included in the new image received.

The invention also relates to a non-transitory computer-readable medium including a computer program having software instructions which, when executed by a computer, implement a method as defined above.

BRIEF DESCRIPTION OF THE DRAWINGS

These features and advantages of the invention will appear more clearly when reading the description that follows, given only as an example, and made with reference to the attached drawings, in which.

DETAILED DESCRIPTION OF THE PREFERRED EMBODIMENTS

Figure 1:
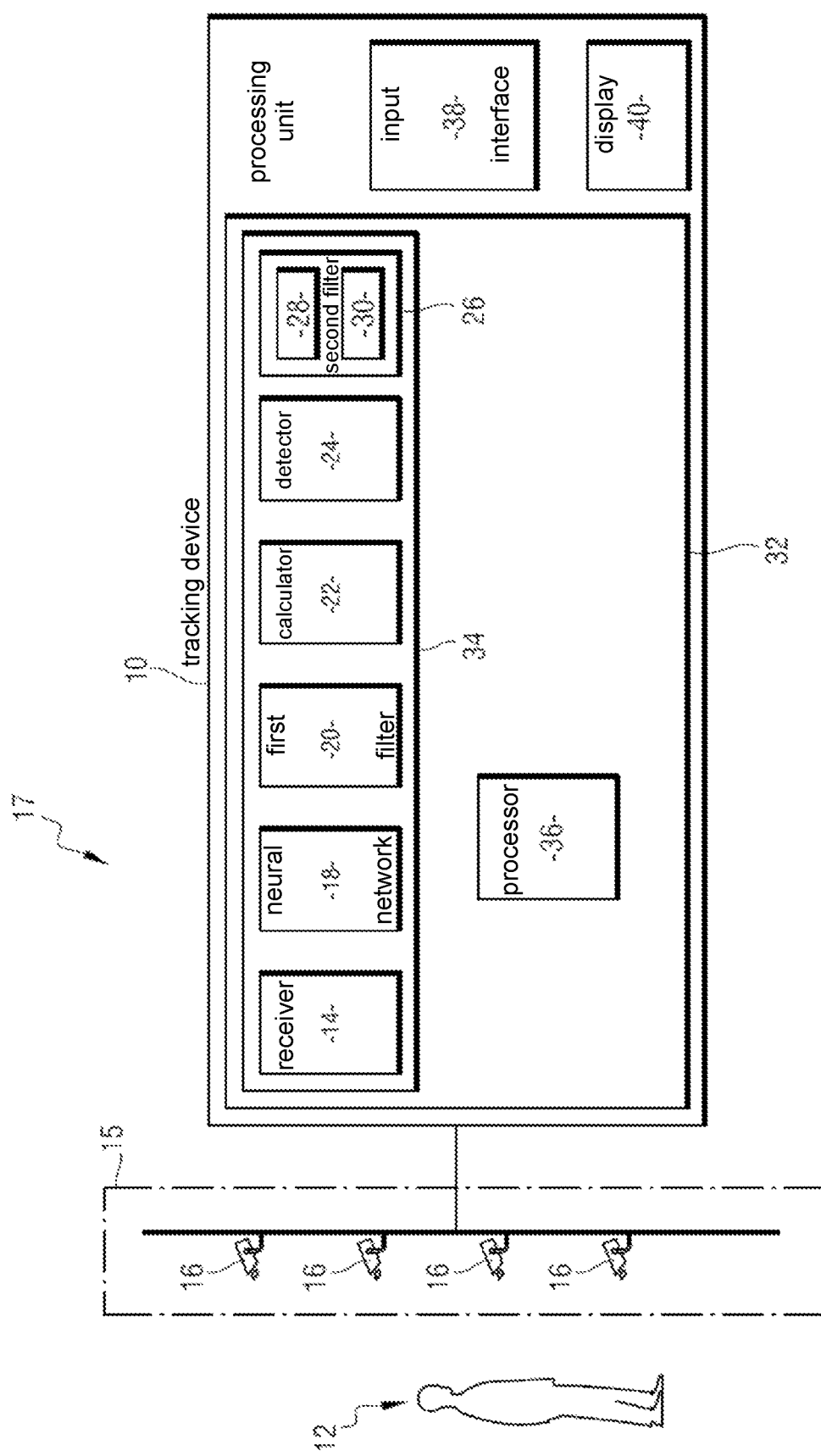
FIG. 1 is a schematic representation of a system for identifying and tracking at least one target comprising a network of image sensors and an electronic identification and tracking device according to the invention, configured to identify and track at least one target.

In FIG. 1, an electronic identification and tracking device 10 is configured to identify and track at least one target 12. In the following, the electronic identification and tracking device 10 will be referred to as tracking device 10.

Tracking device 10 comprises of a receiver module 14 configured to receive images from a network 15 of image sensors 16. Tracking device 10 and the network 15 of image sensors 16 form an electronic identification and tracking system 17 for target 12. Tracking device 10 is thus configured to receive and process images from the image sensor network 15 of image sensors 16.

Tracking device 10 further comprises a determination module 18 configured to determine visual signatures of the respective target 12 from the received images, with each visual signature being determined from a respective image containing a representation of target 12, each visual signature being in the form of a vector in a multidimensional space.

Tracking device 10 further comprises a first filtering module 20 configured to filter visual signatures by retaining each visual signature having, in multidimensional space, a distance from the nearest visual signature in distance to said visual signature that is less than a reference threshold.

Tracking device 10 further comprises a calculation module 22 configured to calculate, in multidimensional space, a reference visual signature from an average of the visual signatures retained by the first filtering module 20. The average of the retained visual signatures forms in particular an aggregation of visual signatures. In particular, the average of the visual signatures is a vector in multidimensional space.

Tracking device 10 further comprises a receiver module 24 configured to detect an appearance of target 12 in at least one new received image, by comparing the reference visual signature with a visual signature of the representation of target 12 comprised in the new received image.

The skilled person will understand that a new received image is an image distinct from the received images used to determine the reference visual signature.

Tracking device 10 further comprises a second filtering module 26 including at least one of a spatio-temporal filter 28 configured to filter said appearance as a function of a position of the image sensor 16 associated with an acquisition of the new image and of a temporal instant of said acquisition, and a visual appearance filter 30 of the target 12 configured to filter said appearance as a function of at least one visual characteristic relating to the representation of the target 12 included in the new received image.

In the example in FIG. 1, tracking device 10 comprises an information processing unit 32 formed, for example, by a memory 34 and a processor 36 associated with memory 34. Tracking device 10 includes an input interface 38, configured to capture input data, such as selections of target 12 by an operator. The tracking device 10 also includes a display module 40 configured to display information from the information processing unit 32.

Target 12 is able to move, and is preferably a living being, in particular a person. In a variant, target 12 is an animal.

In the example in FIG. 1, the receiver module 14, the determination module 18, the first filtering module 20, the calculation module 22, the detection module 24 and the second filtering module 26 are each made in the form of software, or a software component, executable by the processor 36. The memory 34 of tracking device 10 is then able to store receiving software, configured to receive images from the network 15 of image sensors 16, determining software, configured to determine visual signatures of the respective target 12 from the received images, first filtering software, configured to filter the visual signatures by retaining each visual signature presenting, in multidimensional space, a distance from the nearest visual signature in distance to said visual signature which is less than the reference threshold, calculation software, configured to calculate, in multidimensional space, the reference visual signature from the average of the visual signatures retained by the first filtering software, detection software, configured to detect a respective appearance of target 12 in at least one new received image by comparing the reference visual signature with the visual signature of the representation of target 12 included in the new received image, and second filtering software, comprising at least one of the spacio-temporal filter 28 and the visual appearance filter 30. The processor 36 is then able to execute each of the software programs among the reception software 14, the determination software 18, the first filtering software 20, the calculation software 22, the detection software 24 and the second filtering software 26.

In a variant not shown, the receiver module 14, the determination module 18, the first filtering module 20, the calculation module 22, the detection module 24 and the second filtering module 26 are each implemented as a programmable logic component, such as an FPGA (Field Programmable Gate Array), or as a dedicated integrated circuit, such as an ASIC (Application Specific Integrated Circuit).

When the tracking device 10 is implemented as one or more software programs, i.e., as a computer program, it can also be recorded on a non-represented, computer-readable medium. The computer-readable medium is, for example, a medium capable of storing electronic instructions and of being coupled to a bus of a computer system. For example, the readable medium is an optical disk, magneto-optical disk, ROM, RAM, any type of non-volatile memory (for example, EPROM, EEPROM, FLASH, NVRAM), magnetic card or optical card. In particular, the readable media is incorporated in a Solid-State Drive (SSD).

A computer program with software instructions is then stored on the readable medium.

In the example shown in FIG. 1, the receiver module 14, the determination module 18, the first filtering module 20, the calculation module 22, the detection module 24 and the second filtering module 26 are incorporated in the single data processing unit 32, i.e., in a single electronic computer.

In a variant, not shown, the receiver module 14, the determination module 18, the first filtering module 20, the calculation module 22, the detection module 24 and the second filtering module 26 are incorporated within several separate and distinct electronic computers.

According to this variant, the receiver module 14 is arranged, for example, close to the image sensor network 15 of image sensors 16, and connected to each of the image sensors 16 by wire or radio link. As an optional addition, the receiver module 14 is integrated, for example, into a corresponding image sensor 16.

For example, the receiver module 14 is configured to receive images from the network 15 of image sensors 16 via a conversion module, not shown, which is configured to convert video streams from each image sensor 16 into several separate images.

In a variant, the receiver module 14 is configured to receive the separate images directly from the image sensors 16. In this variant, each image sensor 16 in the network 15 includes a respective conversion module, which is configured to convert the respective video stream into several separate images.

In particular, the image sensors 16 of network 15 are arranged in a non-uniform manner. For example, the image sensors 16 are arranged in an urban environment. Each image sensor 16 is a for example video camera, in particular a video camera in the visible range. In a variant or in addition, at least one image sensor 16 is an infrared camera, or IR camera.

The determination module 18 is configured to receive images from the receiver module 14. For example, determination module 18 is configured to generate representations of target 12 from the received images.

A "representation" is understood as a part of the image that includes target 12. The representation is, for example, a shape bounded in a horizontal and vertical direction by the ends of target 12. The representation is, for example, in the form of a polygon, preferably in the form of a rectangle cut out of the corresponding image.

In particular, the determination module 18 comprises a first neural network, with input variables of the first neural network being the received images and an output variable of said first neural network being said representation. The determination module 18 is thus configured in particular to obtain the representation(s) of target 12 via this first neural network.

For example, the determination module 18 is configured to obtain multiple representations of respective targets from each image.

The determination module 18 is further configured to classify the representations according to a chronological order for each target 12. For example, determination module 18 is configured to obtain such classified representations.

For example, determination module 18 is configured to extract the visual signatures of target(s) 12 from the classified representations. In particular, the determination module 18 includes a second neural network, input variables of this second neural network being the classified representations and output variables of this second network being the visual signatures corresponding to the representations.

The determination module 18 is for example configured to determine a visual signature for each representation. Each visual signature is thus determined from a respective image containing a representation of the said target 12. The visual signature includes in particular information relating to the aspect of target 12 visible on the respective representation. In particular, the visual signature is independent of a positioning of target 12 on the respective representation.

Each visual signature is in the form of a vector in multidimensional space, with multidimensional space being a space with 4096 dimensions, for example. In a variant, the multidimensional space is a space with less than 4096 or more than 4096 dimensions, for example a space with 2048 dimensions.

In particular, filtering module 20 is configured to keep only those visual signatures with a distance from the closest visual signature that is less than the reference threshold. The reference threshold includes, for example, a distance threshold value for each dimension of the multidimensional space. In a variant, the reference threshold is an absolute distance value in multidimensional space. By "nearest visual signature", it is understood that this visual signature is positioned at a distance from the said visual signature, in multidimensional space, that is less than all other distances between the said visual signature and each other visual signature in multidimensional space.

In particular, the filtering module is configured to keep visual signatures that have a distance from each other that is less than the reference threshold.

For example, the first filtering module 20 is configured to classify visual signatures among a first group of visual signatures having a distance to their respective closest visual signature that is less than the reference threshold, and a second group of visual signatures having a distance to their respective closest visual signature that is greater than or equal to the reference threshold. In particular, the visual signatures of the first group form a majority cluster, and the visual signatures of the second group are likely to be identified as exhibiting anomalies with respect to the visual signatures of the first group.

For example, the first filtering module 20 is configured to determine the reference threshold so that a predetermined percentage of all visual signatures is included in the first group. The predetermined percentage is 90% or 95% of all visual signatures, for example.

For example, the first filtering module 20 is configured to implement a data partitioning algorithm, such as a DBSCAN (Density-Based Spatial Clustering of Applications with Noise) algorithm.

The first filtering module 20 is in particular configured to retain each visual signature belonging to the first group.

For example, the first filtering module 20 is configured to remove each visual signature belonging to the second group.

In a variant, the first filtering module 20 is configured to mark each visual signature belonging to the second group as a distinct visual signature of target 12. According to this variant, the first filtering module 20 is configured to transmit each distinct visual signature to the calculation module 22. For example, tracking device 10 is configured to identify and track a second distinct target of target 12, with each distinct visual signature relating to this second target.

For example, calculation module 22 is configured to calculate, from the visual signatures retained by the first filtering module 20, the average of these visual signatures. The average of the visual signatures retained by the first filtering module 20 is called the average of visual signatures in the following.

The average of visual signatures is an averaged visual signature, in particular calculated by taking into account the visual signatures kept by the first filtering module 20 only. In particular, the distinct visual signature(s) of target 12 are not taken into account for the calculation of the average of visual signatures.

"Average" is in particular understood as an arithmetic mean. In a variant, the mean is for example a harmonic mean, a geometric mean or a quadratic mean.

For example, the average of visual signatures is the arithmetic mean of the visual signatures retained by the first filtering module 20. In a variant, the average of visual signatures is for example the harmonic mean, geometric mean or quadratic mean of the visual signatures retained by the first filtering module 20.

Calculation module 22 is in particular configured to determine the reference visual signature from the average of visual signatures. For example, calculation module 22 is configured to receive a choice from an operator defining the average of visual signatures, of visual signatures, as the reference visual signature.

Calculation module 22 is configured to store the reference visual signature in a dedicated, non-represented memory, for example.

Detection module 24 is configured to detect the appearance of target 12 in at least one new received image. The new received image is an image captured by one of the image sensors 16 of network 15, for example.

"Appearance" is understood as a potential identification of the presence of target 12 in at least one image, including the new image. In particular, the appearance is determined according to the reference visual signature associated with the respective target.

The detection module 24 is configured, for example, to receive the reference visual signature and a visual signature of the representation of target 12 included in the new image received. The visual signature of the representation of target 12 included in the new received image is called the appearance visual signature in the following.

Detection module 24 is in particular configured to receive the appearance visual signature from the calculation module 22. For example, detection module 24 is configured to receive the appearance visual signature obtained from at least one new image. The appearance visual signature is a visual signature obtained from the determination of one or more visual signatures of target 12 from the new image(s) received. In addition, the appearance visual signature is a visual signature obtained from a filtering, by the first filtering module 20, of this/these visual signature(s) while preserving each visual signature having a distance, in multidimensional space, from the closest visual signature in terms of distance from the said visual signature, that is less than the reference threshold. Also, the appearance visual signature is a visual signature obtained from a calculation, by the calculation module 22, of the appearance visual signature from the average of the visual signature(s) retained by the first filtering module 20.

The detection module 24 is configured, for example, to compare the appearance visual signature with the reference visual signature. In particular, detection module 24 is configured to determine, in multidimensional space, a detection distance between the appearance visual signature and the reference visual signature. The detection module 24 is configured to detect the appearance of target 12 in the new image(s) when the detection distance is less than a detection threshold. The detection threshold comprises, for example, a predetermined value for each dimension in multidimensional space.

In the example shown in FIG. 1, the second filtering module 26 comprises the spatio-temporal filter 28 and the visual appearance filter 30.

As an alternative not shown, the second filtering module 26 comprises a single filter from the spatio-temporal filter 28 and the visual appearance filter 30.

For example, the second filtering module 26 is configured to receive the appearance of target 12 from detection module 24. In addition, the second filtering module 26 is also configured to receive information relating to the new received image and/or the representation of target 12 included in the new received image.

For example, the second filtering module 26 is configured to filter out a false positive from the appearance of target 12. A "false positive" is understood as a false identification of target 12. In particular, the second filtering module 26 is configured to detect an actual absence of target 12 for an appearance previously detected by the detection module 24.

In particular, the second filtering module 26 is configured to generate a filtered appearance, with the filtered appearance comprising only those appearances of target 12 that satisfy one or more filtering criteria of the spatio-temporal filter 28 and/or the visual appearance filter 30.

The spatio-temporal filter 28 is configured, for example, to compare the position of the image sensor 16 associated with the acquisition of the new image and the temporal instant of this acquisition with a reference position and respectively with a reference instant. The reference position is a position of the image sensor 16 associated with the acquisition of a previous image, for example, and the reference time is the temporal time of the acquisition of the previous image, for example. The previous image is an image corresponding to the reference visual signature, for example.

The spatio-temporal filter 28 is configured, for example, to calculate an average speed of movement of target 12 between the reference position of target 12 and the position of the image sensor 16 associated with the acquisition of the new image.

The spatio-temporal filter 28 is configured, for example, to compare the average speed to a reference speed. The spatio-temporal filter 28 is configured, for example, to attribute to the appearance an effective detection probability of target 12 as a function of the average speed, in comparison with the reference speed. The reference speed is, for example, a function of a mode of movement of target 12, a type of target 12 and/or a speed calculated according to a predetermined speed in a movement zone. The mode of travel is walking, motorized or non-motorized movement, for example.

For example, the visual appearance filter 30 comprises a third neural network, configured to input the representation of target 12 in the new received image, and to output at least the visual characteristic related to the representation of target 12 in the new received image. For example, the visual appearance filter 30 is configured to compare the visual characteristic related to the representation of target 12 included in the new received image with a corresponding reference visual characteristic.

For example, visual appearance filter 30 is configured to filter the appearance based on a respective visual characteristic such as a color within the target 12 representation or a shape of an outline of the target 12 representation.

When the visual characteristic is the color within the target 12 representation, the visual appearance filter 30 is configured, for example, to compare the color in an area of the representation with a reference color. The area is for example target's upper body 12 or legs. For example, visual appearance filter 30 is configured to calculate an average color of pixels in the area, and compare the average color to the reference color. The color average is the arithmetic average of the colors, for example. In a variant, the color average is the harmonic, geometric or quadratic mean of the colors, for example.

The visual appearance filter 30 is configured to filter out the appearance where the average color of the area differs from a reference color, for example. Visual appearance filter 30, for example, is set to filter the appearance if the average color of the area has a distance in a color space from a reference position in that color space that is greater than a color threshold.

For example, visual appearance filter 30 includes a model adapted to implement the CIELAB color space. The model comprises at least a first parameter, which is color clarity. "Clarity", is understood as quantity relative to the luminance of the color in the zone. The luminance defines the visual sensation of luminosity of the color in the zone, indicated in candelabra per square meter, for example. The model also comprises a second parameter a* and a third parameter b*, for example, with the second and third parameters corresponding to a deviation of the color from the color of a gray surface of the same brightness. Those skilled in the art will understand that the second parameter a* and a third parameter b* are also each referred to as "color temperature". The gray surface is a standardized daylight illuminated surface, also called D65, for example. In particular, the implementation of the CIELAB space makes it possible to filter out colors that conform to human color perception.

In a variant, the visual appearance filter 30 includes another model configured to implement a color space, such as a TSV (Hue Saturation Value) model, also known as an HSV (Hue Saturation Value) model.

The visual appearance filter 30 including the model adapted to implement the CIELAB color space enables accounting for changes in brightness between multiple image sensors 16 because the model takes into account the visual sensation of color brightness. This improves the reliability of target identification and tracking 12.

When the visual feature is the shape of the outline of the target 12 representation, the visual appearance filter 30 is configured to compare the shape of the outline within the target 12 representation with the shape of a reference outline. The outline is a garment, such as pants, dress, skirt, shirt, t-shirt, tank top, jacket or coat for example. In a variant or complement, the outline is an accessory worn by target 12, such as a bag, glasses or hat.

The display module 40 comprises one or more screens, for example, configured to display information from the information processing unit 32, in particular an image of the filtered appearance of target 12, a time instant of the acquisition of this image, and/or a position of the image sensor 16 associated with this acquisition.

Figure 2:
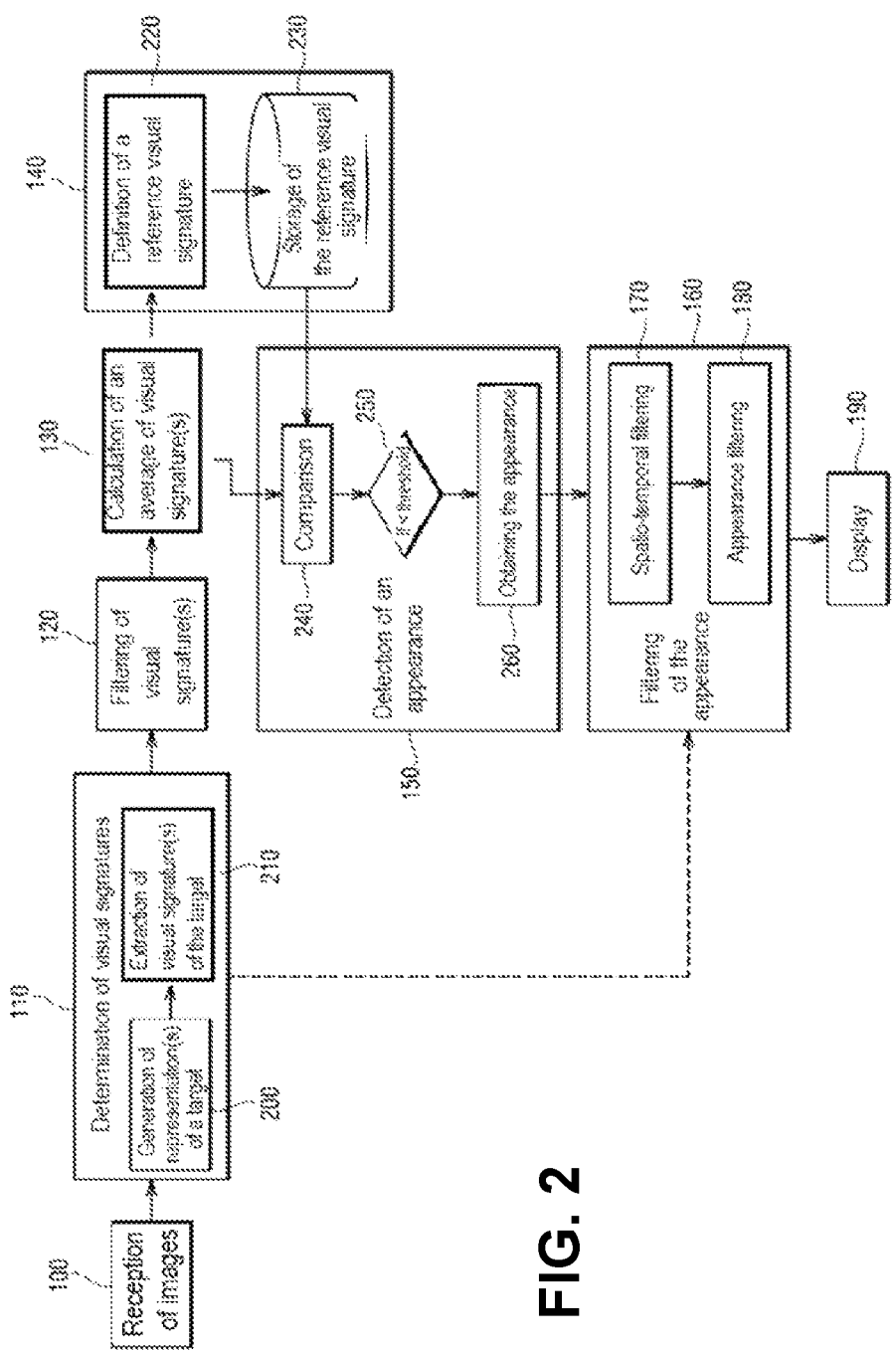
FIG. 2 is a flowchart of a method, according to the invention, for identifying and tracking at least one target, with the method being implemented by the electronic identification and tracking device in FIG. 1.

The operation of the tracking device 10 according to the invention will now be explained with the help of FIG. 2 representing a flowchart of the identification and tracking method for target 12, the method being implemented by the tracking device 10.

In an initial step 100, the receiver module 14 receives the images from the image sensor 16 network 15.

In the next step 110, the determination module 18 determines the visual signatures of the respective target 12 from the received images. In this determination step 110, each visual signature is thus determined from a respective image containing a representation of the said target 12.

In the next step 120, the first filtering module 20 filters visual signatures by retaining each visual signature having a distance, in multidimensional space, from the closest visual signature in distance to said visual signature, that is less than the reference threshold.

In the next step 130, the calculation module 22 calculates, for example, from the visual signatures retained by the first filtering module 20, the average of these visual signatures, called the average of visual signatures.

In the next step 140, the calculation module 22 calculates, in multidimensional space, the reference visual signature from the average of visual signatures, i.e., the average of the visual signatures retained during the first filtering step 120.

In the next step 150, the detection module 24 detects an appearance of target 12 in at least one new received image by comparing the reference visual signature with a visual signature of the representation of target 12 included in the new received image.

During the following step 160, the second filtering module 26 filters the appearance by implementing at least one sub-step among a spatio-temporal filtering sub-step 170, during which the spatio-temporal filter 28 filters said appearance according to a position of the image sensor 16 associated with an acquisition of the new received image and a temporal instant of said acquisition, and a visual appearance filtering sub-step 180 of target 12, in which the visual appearance filter 30 filters said appearance based on at least one visual characteristic related to the representation of target 12 included in the new received image.

In the example in FIG. 2, during this second filtering step 160, the second filtering module 26 implements the spacio-temporal filtering 170 and visual appearance filtering 180 sub-steps.

According to a variant, not shown, during this second filtering step 160, the second filtering module 26 implements a single sub-step among the spatio-temporal filtering sub-step 170 and the visual appearance filtering sub-step 180.

During the following step 190, the display module 40 displays information from the information processing unit 32, for example an image of the filtered appearance of target 12 received from the information processing unit 32, a temporal instant of the acquisition of this image, and/or a position of the image sensor 16 associated with this acquisition.

Receiving step 100 will now be described in more detail.

During reception step 100, receiver module 14 receives images, for example, from the network 15 of image sensors 16 via a conversion module, which is configured to convert video streams from each image sensor 16 into several distinct images.

In a variant, receiver module 14 receives the separate images directly from the image sensors 16. In this variant, each image sensor 16 in the network 15 converts the respective video stream into several separate images.

Determination step 110 will now be described in more detail.

In a sub-step 200, the determination module 18 receives the images from receiver module 14. For example, determination module 18 then generates representations of target 12 from the received images. The determination module 18 generates the representation(s) of target 12 via its first neural network, with the first neural network receiving the received images as input and providing the representation as output.

For example, during this sub-step 200, the determination module 18 obtains multiple representations of respective targets from each image.

The determination module 18 further classifies the representations according to a chronological order for each target 12. Determination module 18 obtains representations thus classified.

In a sub step 210, determination module 18 extracts the visual signatures of target(s) 12 from the classified representations. In particular, the second neural network receives the classified representations as input and provides the visual signatures corresponding to the representations as output. In particular, the determination module 18 determines a visual signature for each representation.

The first filtering step 120 will now be described in more detail.

In the first filtering step 120, the filtering module 20 retains, among other things, only those visual signatures whose distance from the closest visual signature to the respective visual signature is less than the reference threshold.

For example, the first filtering module 20 classifies visual signatures among the first group of visual signatures having a distance from their respective closest visual signature that is less than the reference threshold, and the second group of visual signatures having a distance from their respective closest visual signature that is greater than or equal to the reference threshold.

The first filtering module 20 determines the reference threshold so that the predetermined percentage of visual signatures is included in the first group.

For example, the first filtering module 20 implements a data partitioning algorithm, such as the DBSCAN algorithm.

For example, the first filtering module 20 removes each visual signature belonging to the second group.

In a variant, the first filtering module 20 marks each visual signature belonging to the second group as a distinct visual signature of target 12. In this variant, the first filtering module 20 transmits each distinct visual signature to the calculation module 22. Thus, in this variant, tracking device 10 also identifies and tracks the second distinct target of target 12.

Calculation step 140 will now be described in more detail.

In a sub-step 220, calculation module 22 determines the reference visual signature from the average of the visual signatures. For example, calculation module 22 receives a choice from an operator defining the average of visual signatures as the reference visual signature.

In a sub-step 230, the calculation module 22 stores the reference visual signature in a dedicated memory.

Determination step 150 will now be described in more detail.

During the detection step 150, the detection module 24 receives the reference visual signature and the visual signature of the representation of target 12 included in the new received image, the so-called appearance visual signature.

For example, to obtain the appearance visual signature, reception 100, determination 110, first filtering 120 and calculation 130, steps are implemented for the new image(s). For example, receiver module 14 receives the new image(s) from the image 16 sensor network 15. Then the determination module 18 determines visual signatures of the respective target 12 from the new image(s) received. Then, the first filtering module 20 filters the visual signatures by retaining each visual signature having a distance, in multidimensional space, from the respective closest visual signature among the visual signatures corresponding to the new image(s), which is less than the reference threshold. Then, the calculation module 22 calculates, from the visual signatures corresponding to the new image(s) and retained by the first filtering module 20, the average of these visual signatures, which is the appearance visual signature.

In a sub-step 240 of the determination step 150, the detection module 24 compares for example the appearance visual signature with the reference visual signature. In particular, detection module 24 determines a detection distance in multidimensional space between the appearance visual signature and the reference visual signature.

In a sub-step 250 of the determination step 150, detection module 24 compares the detection distance with the detection threshold.

If the distance is less than the detection threshold, in a sub-step 260 of determination step 150, detection module 24 obtains the appearance of target 12 in the new image(s), and thus detects the appearance.

The second filtering step 160 will now be described in more detail.

In the second filtering step 160, the second filtering module 26 receives, for example, the appearance of target 12 from detection module 24. In addition, the second filtering module 26 also receives information about the new received image and/or the representation of target 12 included in the new received image.

During this second filtering step 160, the second filtering module 26 filters out a false positive, among other things, from the appearance of target 12. In particular, the second filtering module 26 generates the filtered appearance, with the filtered appearance including only the appearances of target 12 satisfying one or more criteria of the spatio-temporal filtering and/or the visual appearance filtering.

During the spatio-temporal filtering sub-step 170, the spatio-temporal filter 28 compares the position of the image sensor 16 associated with the acquisition of the new image and the temporal instant of this acquisition with the reference position and respectively the reference instant.

For example, the spatio-temporal filter 28 calculates the average speed of movement of target 12 between the reference position of target 12 and the position of the image sensor 16 associated with the acquisition of the new image. For example, the spatio-temporal filter 26 compares the average speed to the reference speed. The spatio-temporal filter 28, for example, assigns to the appearance a probability of effective detection of target 12 as a function of the average speed, in comparison with the reference speed.

In the visual appearance filtering sub-step 180, the visual appearance filter 30, in particular at the input of the third neural network, receives the representation of target 12 included in the new received image, and provides, in particular at the output of the third neural network, at least the visual characteristic relating to the representation of target 12 comprised in the new received image. The visual appearance filter 30 compares, for example, the visual characteristic relating to the representation of target 12 in the new received image with a corresponding reference visual characteristic.

For example, the visual appearance filter 30 filters the appearance based on a respective visual characteristic, such as a color within the target 12 representation or a shape of an outline of the target 12 representation.

When the visual characteristic is the color within the target 12 representation, visual appearance filter 30 compares the color in an area of the representation with a reference color. For example, visual appearance filter 30 averages the color of pixels in the area and compares the average color to the reference color. For example, visual appearance filter 30 filters out the appearance where the average color of the area differs from a reference color. In particular, the visual appearance filter 30 filters the appearance if the average color of the area has a distance in the color space from a reference position in the color space that is greater than the color threshold.

For example, visual appearance filter 30 includes a model using the CIELAB color space.

When the visual feature is the shape of the outline of the target 12 representation, the visual appearance filter 30 compares the shape of the outline within the target 12 representation with the shape of a reference outline.

For example, the identification and tracking method is implemented for each image received from the network 15 of image sensors 16.

It is then conceivable that the tracking device 10 according to the invention and the associated method allow to identify and track at least target 12 in a less complex and more reliable way.

What is claimed is:

1. An electronic identification and tracking device for at least one target, comprising:
   a receiver configured to receive images from a network of image sensors;
   at least one neural network configured to determine visual signatures of a respective target from the images that are received,
      wherein each visual signature of the visual signatures is determined from a respective image including a representation of said respective target, and
         wherein said each visual signature is in a form of a vector in a multi-dimensional space;
   a first filter configured to filter the visual signatures by retaining said each visual signature comprising a distance, in the multi-dimensional space, from a first visual signature that is nearest in distance to a second visual signature that is less than a reference threshold;
   a calculator configured to calculate, in the multi-dimensional space, a reference visual signature from an average of the visual signatures retained by the first filter;
   a detector configured to detect an appearance of the respective target in at least one new received image, by comparing the reference visual signature with a visual signature of the representation of the respective target included in the at least one new received image, and
   a second filter comprising at least one of
      a spatio-temporal filter configured to filter said appearance as a function of a position of an image sensor of the network of image sensors associated with an acquisition of the at least one new received image and of a temporal instant of said acquisition, and
      a visual appearance filter of the respective target configured to filter said appearance as a function of at least one visual characteristic relating to the representation of the respective target comprised in the at least one new received image.

2. The electronic identification and tracking device for at least one target according to claim 1, wherein the at least one neural network is further configured to obtain the representation of said respective target via a first neural network of said at least one neural network, wherein input variables of the first neural network are the images that are received and an output variable of the first neural network is the representation.

3. The electronic identification and tracking device for at least one target according to claim 1, wherein the spatio-temporal filter is further configured to calculate an average speed of movement of the respective target between a reference position of the respective target and the position of the image sensor associated with the acquisition of the at least one new received image.

4. The electronic identification and tracking device for at least one target according to claim 3, wherein the spatio-temporal filter is further configured to assign to said appearance a probability of actual detection of the respective target as a function of an average velocity as compared to a reference velocity.

5. The electronic identification and tracking device for at least one target according to claim 1, wherein each visual characteristic of said at least one visual characteristic is selected from a group consisting of a color within the representation of the respective target and a shape of an outline of the representation of the respective target.

6. The electronic identification and tracking device for at least one target according to claim 5, wherein the visual appearance filter comprises a model comprising at least a first parameter, wherein the first parameter comprises color clarity, and wherein the model is configured to implement CIELAB color space.

7. The electronic identification and tracking device for at least one target according to claim 1, wherein the visual appearance filter comprises another neural network, configured to
 receive as input the representation of the respective target included in the at least one new received image, and
 provide as output at least the at least one visual characteristic relating to the representation of the respective target included in the at least one new received image, wherein the visual appearance filter is further configured to compare said at least one visual characteristic with a corresponding reference visual characteristic.

8. The electronic identification and tracking device for at least one target according to claim 1, further comprising said network of image sensors.

9. A method for identifying and tracking at least one target, the method being implemented by an electronic identification and tracking device and comprising:
 receiving images from a network of image sensors;
 determining visual signatures of a respective target from the images that are received,
  wherein each visual signature of said visual signatures is determined from a respective image including a representation of said respective target, and
   wherein said each visual signature is in a form of a vector in a multi-dimensional space;
 a first filtering comprising filtering the visual signatures by retaining said each visual signature comprising a distance, in the multi-dimensional space, from a first visual signature that is nearest in distance to a second visual signature that is less than a reference threshold;
 calculating, in the multi-dimensional space, a reference visual signature from an average of the visual signatures retained during the first filtering;
 detecting an appearance of the respective target in at least one new received image, by comparing the reference visual signature with a visual signature of the representation of the respective target included in the at least one new received image; and
 a second filtering comprising at least one of
 spatio-temporal filtering comprising filtering of said appearance as a function of a position of an image sensor of the network of image sensors associated with an acquisition of the at least one new received image and of a temporal instant of said acquisition, and
 visual appearance filtering of the respective target, the visual appearance filtering comprising filtering of said appearance as a function of at least one visual characteristic relating to the representation of the respective target comprised in the at least one new received image.

10. A non-transitory computer-readable medium including a computer program comprising software instructions that implement a method for identifying and tracking at least one target, when executed by a computer, wherein said method comprises:
 receiving images from a network of image sensors;
 determining visual signatures of a respective target from the images that are received,
  wherein each visual signature of said visual signatures is determined from a respective image including a representation of said respective target, and wherein said each visual signature is in a form of a vector in a multi-dimensional space;
 a first filtering comprising filtering the visual signatures by retaining said each visual signature comprising a distance, in the multi-dimensional space, from a first visual signature that is nearest in distance to a second visual signature that is less than a reference threshold;
 calculating, in the multi-dimensional space, a reference visual signature from an average of the visual signatures retained during the first filtering;
 detecting an appearance of the respective target in at least one new received image, by comparing the reference visual signature with a visual signature of the representation of the respective target included in the at least one new received image; and
 a second filtering comprising at least one of
 spatio-temporal filtering comprising filtering of said appearance as a function of a position of an image sensor of the network of image sensors associated with an acquisition of the at least one new received image and of a temporal instant of said acquisition, and
 visual appearance filtering of the respective target, the visual appearance filtering comprising filtering of said appearance as a function of at least one visual characteristic relating to the representation of the respective target comprised in the at least one new received image.

* * * * *